Patented Sept. 20, 1932

1,878,061

UNITED STATES PATENT OFFICE

ARTHUR WALSH TITHERLEY, OF WINCHESTER, AND DONALD PRYCE HUDSON, OF LLANGOLLEN, ENGLAND, ASSIGNORS TO MONSANTO CHEMICAL WORKS, OF ST. LOUIS, MISSOURI, A CORPORATION OF MISSOURI

MANUFACTURE OF AROMATIC HYDROXY COMPOUNDS

No Drawing. Application filed September 28, 1927. Serial No. 222,684.

This invention relates to improvements in the manufacture of aromatic hydroxy compounds by the hydrolysis of diazotized amines.

Phenolic substances or others containing hydroxyl groups are in most instances prepared from the corresponding primary amines by the use of nitrous acid and subsequent decomposition of the diazo-compound thus formed.

This decomposition is usually brought about in aqueous solutions and in cases where the hydroxylic compound is volatile in steam it is usual to remove it by steam distillation as the reaction proceeds.

As a general rule the yield of hydroxylic compounds by these methods is not high and losses occur owing to interaction between the hydroxylic compound and the undecomposed diazo body; further complicated reactions occur and produce tarry or resinous products and these reactions may proceed more vigorously when the solution is kept at the temperature required for the steam distillation.

It is well known that the usual use of aqueous dilute solution of sulphuric acid as a decomposing medium has been improved upon by using aqueous solutions of sulphates or other salts e. g. copper sulphate, sodium sulphate; and that it has also been suggested to add salts such as normal sodium phosphate to the dilute sulphuric acid solutions.

The object of the invention is to provide improved methods in performing these well known hydrolytic reactions, whereby good yields can be obtained in a simple manner.

According to the invention, the hydrolysis is performed in presence of a solvent immiscible (i. e. not completely miscible or preferably not miscible at all) with water, and said solvent is used to extract the reaction product from the reaction mixture, continuously or substantially so. Vigorous agitation is desirable to this end.

It is preferred to effect the hydrolysis in presence of a catalyst such as copper sulphate, though other known catalysts can be employed.

Among examples of reactions to which our invention has been successfully applied, we may mention the manufacture of guaiacol, althacol, $(C_6H_4.OH.OC_2H_5 1.2)$, vanillin and bourbonal $$(C_6H_3.OH.OC_2H_5.CHO.1.2.4)$$

We have also successfully treated diazotized cresidine, p.amino m ethoxy benzaldehyde, p amino. m. methoxy toluene but the invention is not limited thereto as it is applicable to a wide range of known reactions.

Among suitable solvents may be mentioned benzene and toluene but these are given merely by way of example.

EXAMPLE 1

Guaiacol from o-anisidine 123 parts by weight of o-anisidine are dissolved in 620 parts by weight of 25% sulphuric acid (by weight) and this solution is diazotized in the usual manner by adding a 25% aqueous solution of sodium nitrite at a temperature below 10° C. until a very slight excess of nitrous acid is shown by the starch-iodine test. This solution is added very slowly to a continuously and vigorously stirred mixture of a saturated solution obtained by dissolving copper sulphate in 300 parts by weight of water, and 435 parts by weight of toluene, the mixture being maintained at a temperature of 100° C. under a reflux condenser. (During the addition of the diazo solution, the copper sulphate solution tends to become less concentrated and therefore either solid copper sulphate is added from time to time or sufficient excess solid copper sulphate is present at the beginning to form a saturated solution at the end of the addition). The mixture is cooled, the toluene layer separated and subjected to steam distillation, whereby both toluene and guaiacol distil in steam. The distillate is extracted with aqueous caustic soda and the alkaline layer is separated, acidified, and extracted with ether. The ethereal extract is fractionated, whereby guaiacol is obtained (112 grams freezing at 27–28° C; 90% theory).

Example II

Vanillin from 4 amino. 3-methoxy benzaldehyde 4 amino 3 methoxy benzaldehyde (20 parts by weight) is dissolved in a warm solution of 21.6 parts by weight of sulphuric acid (sp. gr. 1.84) in 150 parts by weight of water and the solution cooled with stirring. The red crystalline paste is diazotized with a solution of 9.5 parts by weight g. sodium nitrate in 25 parts by weight of water at below 25° C. and the now clear solution added gradually to a well stirred mixture of 435 parts by weight toluene and an equal volume of a saturated aqueous solution of copper sulphate at 100° C. under reflux. When half the diazo solution is added the toluene is replaced by 435 parts by weight of fresh toluene and the addition continued at 100° C. with stirring. The solution is kept saturated with copper sulphate throughout the whole operation. The mixture is cooled, and the toluene layer separated. Both toluene layers are filtered and extracted with aqueous caustic soda. The caustic layer is separated, acidified and extracted with ether. On removal of the ether by evaporation, vanillin is obtained as a crystalline mass, which can be purified by well known methods. Homologues of vanillin such as bourbonal may be similarly produced.

Example III o-ethoxy-phenol from o-phenetidine o-phenetidine (137 grammes) is dissolved in 800 grs. of 20% aqueous sulphuric acid and this solution is diazotized in the usual manner with a solution of 69 grs. of sodium nitrite in 200 grs. of water at a temperature below 10° C. This solution is very gradually added to a solution of 300 grs. copper sulphate in 300 grs. water maintained at a temperature of 90° C. and provided with a reflux condenser. The copper sulphate solution is continuously and vigorously stirred and during the addition of the diazo solution a stream of toluene is continuously circulated through and removed from the solution. In this manner the toluene continuously removes the formed ethoxy phenol, which is extracted from the toluene by means of a 20% aqueous caustic soda solution; the washed toluene being returned to the copper sulphate solution. The caustic solution is separated from the toluene, acidified and extracted with a suitable solvent, e. g. benzene, and the benzene layer separated. The benzene extract, containing the ethoxy phenol, is fractionated.

Yield of o-ethoxy phenol 124 grs., 90% theory.

The solvent employed should have a boiling point high enough to enable the diazo compound to be decomposed. The hydroxy compound can be separated from the solvent either by distillation of the latter or by chemical extraction or by precipitation or crystallization. In order to render the process continuous the solvent containing the hydroxy body may be continuously removed and after the hydroxy body has been removed therefrom can be returned to the vessel in which decomposition is being effected. The separation of the dissolved product may be effected by distillation, by cooling and filtration, by chemical means, e. g. extraction with caustic solution or in any suitable manner.

In certain cases it is desirable to neutralize any acidity which may develop owing to the decomposition of the diazonium salt, e. g. by the addition of sodium carbonate.

It is desirable to use a highly concentrated solution of copper sulphate or otherwise tar formation may increase.

We declare that what we claim is:

1. The process of preparing aromatic hydroxy compounds which includes the step of hydrolyzing a diazotized aromatic amino compound in presence of a solvent immiscible with water, and using said solvent to extract the reaction product, substantially continuously from the reaction mixture.

2. The process of preparing aromatic hydroxy compounds which includes the step of hydrolyzing a diazotized aromatic amino compound with the aid of a soluble copper salt as catalyst in presence of a solvent immiscible with water, and using said solvent to extract the reaction product, substantially continuously from the reaction mixture.

3. The process of preparing aromatic hydroxy compounds which consists in hydrolyzing a diazotized aromatic amino compound in aqueous solution while agitating said solution with a body of solvent immiscible therewith, using said solvent to extract the reaction product, substantially continuously, from the reaction mixture, and thereafter separating the hydroxy compound from the solvent.

4. The process of preparing aromatic hydroxy compounds which includes the step of hydrolyzing a diazotized aromatic amino compound with the aid of copper sulphate as catalyst in presence of a solvent immiscible with water, and using said solvent to extract the reaction products, substantially continuously, from the reaction mixture.

5. The process of preparing aromatic hydroxy compounds which consists in hydrolyzing a diazotized aromatic amino compound in aqueous solution while agitating said solution with a body of a hydrocarbon solvent, using said solvent to extract the reaction product, substantially continuously, from the reaction mixture and then isolating the hydroxy compound from its solution in said hydrocarbon.

6. The process of preparing aromatic hydroxy compounds which consists in hydrolyzing an aromatic diazo compound in presence of a body of an immiscible solvent, drawing off continuously the solution of the thus formed hydroxy compound in the solvent, separating the compound from the solvent, and returning said solvent, freed from the compound, to the reaction.

7. The process of preparing alkoxycatechols by hydrolyzing a diazotized aromatic alkoxy amino compound in which the hydrolysis is performed in presence of a solvent immiscible with water, and using said solvent to extract the reaction product, substantially continuously from the reaction mixture.

8. The process of preparing guaiacol by hydrolyzing diazotized ortho anisidine in which the hydrolysis is performed in presence of a solvent immiscible with water, and using said solvent to extract the reaction product, substantially continuously from the reaction mixture.

9. The process of preparing aromatic hydroxy compounds, characterized by hydrolyzing a diazotized aromatic amino compound in the presence of a solvent immiscible with water, using said solvent to extract the reaction product, substantially continuously, from the reaction mixture, and thereafter separating the hydroxy compound from the solvent.

10. The method which consists in hydrolyzing at least one of the following materials: a diazotized aromatic amino aldehyde and a diazotized aromatic alkoxy amino compound, in the presence of an aqueous medium while agitating said medium with a liquid solvent for the hydrolyzed product which is immiscible with the aqueous medium, thereby removing the product from the sphere of the hydrolysis reaction as formed.

11. A process for the manufacture of a hydroxylic compound from a primary aryl amine which consists in diazotizing the amine in aqueous solution with a nitrite, and bringing about the decomposition of the resulting product in aqueous solution in presence of a solvent for the hydroxylic compound thereby produced, such solvent being inert chemically with regard to the remaining constituents of the reaction mixture and substantially immiscible with the aqueous solution, whereby the hydroxylic compound is extracted progressively from the aqueous solution, immediately it is formed.

12. A process for the manufacture of a hydroxylic compound from an amine as claimed in claim 11 wherein the said solvent is maintained by agitation in intimate mixture with the said aqueous solution.

13. In the process of preparing aromatic hydroxy compounds, the step which comprises hydrolyzing the product resulting from the diazotization of a primary aryl amine, the hydrolysis being conducted in aqueous solution in the presence of a solvent for the hydroxy compound thereby produced, such solvent being chemically inert with regard to the constituents of the reaction mixture and substantially immiscible with the aqueous solution.

14. In the process of preparing aromatic hydroxy compounds, the step which comprises hydrolyzing the product resulting from the diazotization of a primary aryl amine, the hydrolysis being conducted in aqueous solution in the presence of a solvent from the hydroxy compound thereby produced, such solvent being chemically inert with regard to the constituents of the reaction mixture and substantially immiscible with the aqueous solution, said solvent being maintained by agitation in intimate contact with said aqueous solution.

15. In the process of preparing aromatic hydroxy compounds, the step which comprises hydrolyzing the product resulting from the diazotization of a primary aryl amine, the hydrolysis being conducted in aqueous solution in the presence of a solvent from the hydroxy compound thereby produced, such solvent being chemically inert with regard to the constituents of the reaction mixture and substantially immiscible with the aqueous solution, said hydrolysis being conducted in the presence of copper sulfate as a catalyst.

16. In the process of preparing an alkoxy catechol, the step which comprises diazotizing and subsequently hydrolyzing the corresponding alkoxy amino compound, the hydrolysis being conducted in aqueous solution in the presence of a solvent for the alkoxy catechol thereby produced, such solvent being chemically inert with regard to the constituents of the reaction mixture and substantially immiscible with the aqueous solution.

17. In the process of preparing guaiacol, the step which comprises hydrolyzing diazotized o-anisidine, the hydrolysis being conducted in aqueous solution in the presence of a solvent for guaiacol, such solvent being chemically inert with regard to the constituents of the reaction mixture and substantially immiscible with the aqueous solution.

18. In the process of preparing vanillin, the step which comprises hydrolyzing diazotized 4-amino-3-methoxy-benz-aldehyde, the hydrolysis being conducted in aqueous solution in the presence of a solvent for vanillin, such solvent being chemically inert with regard to the constituents of the reaction mixture and substantially immiscible with the aqueous solution.

19. In the process of preparing vanillin, the step which comprises hydrolyzing diazotized 4-amino-3-methoxy-benzaldehyde in aqueous solution in the presence of toluene.

20. In the process of preparing vanillin, the step which comprises hydrolyzing diazotized 4-amino-3-methoxy-benzaldehyde in an aqueous solution of copper sulfate in the presence of toluene.

In witness whereof, we have hereunto signed our names this 2nd day of September 1927, and this 1st day of September 1927.

A. W. TITHERLEY.
DONALD PRYCE HUDSON.